US009327643B2

(12) United States Patent
Salter

(10) Patent No.: US 9,327,643 B2
(45) Date of Patent: May 3, 2016

(54) PHOTOLUMINESCENT LIFT GATE LAMP

(71) Applicant: Ford Global Technologies, LLC, Dearborn, MI (US)

(72) Inventor: Stuart C. Salter, White Lake, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/452,942

(22) Filed: Aug. 6, 2014

(65) Prior Publication Data

US 2015/0197194 A1 Jul. 16, 2015

Related U.S. Application Data

(63) Continuation-in-part of application No. 14/301,635, filed on Jun. 11, 2014, which is a continuation-in-part of application No. 14/156,869, filed on Jan. 16, 2014, which is a continuation-in-part of application No. 14/086,442, filed on Nov. 21, 2013.

(51) Int. Cl.
*F21V 11/00* (2015.01)
*B60Q 3/06* (2006.01)
*B60Q 3/00* (2006.01)
*B60Q 3/02* (2006.01)

(52) U.S. Cl.
CPC *B60Q 3/06* (2013.01); *B60Q 3/002* (2013.01); *B60Q 3/004* (2013.01); *B60Q 3/008* (2013.01); *B60Q 3/0216* (2013.01); *B60Q 3/0283* (2013.01)

(58) Field of Classification Search
CPC ...... B60Q 3/002; B60Q 3/004; B60Q 3/0216; B60Q 3/0283; B60Q 3/06

USPC .................. 362/487, 493, 496, 501, 505, 510
See application file for complete search history.

(56) References Cited

U.S. PATENT DOCUMENTS

| | | | |
|---|---|---|---|
| 6,729,738 B2 | 5/2004 | Fuwausa et al. |
| 6,773,129 B2 | 8/2004 | Anderson, Jr. et al. |
| 6,871,986 B2 | 3/2005 | Yamanaka et al. |
| 6,990,922 B2 | 1/2006 | Ichikawa et al. |
| 7,213,923 B2 | 5/2007 | Liu et al. |
| 7,216,997 B2 | 5/2007 | Anderson, Jr. |
| 7,264,366 B2 | 9/2007 | Hulse |
| 7,264,367 B2 | 9/2007 | Hulse |
| 7,753,541 B2 | 7/2010 | Chen et al. |
| 7,834,548 B2 | 11/2010 | Jousse et al. |
| 8,016,465 B2 | 9/2011 | Egerer et al. |

(Continued)

FOREIGN PATENT DOCUMENTS

| | | |
|---|---|---|
| CN | 201169230 Y | 12/2008 |
| CN | 201193011 Y | 2/2009 |

(Continued)

*Primary Examiner* — Jason Moon Han
(74) *Attorney, Agent, or Firm* — Vichit Chea; Price Heneveld LLP

(57) ABSTRACT

An illumination apparatus for a vehicle is disclosed. The illumination device comprises a photoluminescent portion disposed on a moveable vehicle closure. The photoluminescent portion is operable to be directed in a substantially downward direction. The device further comprises a light source disposed proximate the photoluminescent portion and configured to emit light at a first wavelength. The photoluminescent portion is configured to convert the first wavelength to at least a second wavelength longer than the first wavelength to illuminate a surface beneath the vehicle.

15 Claims, 4 Drawing Sheets

(56) References Cited

U.S. PATENT DOCUMENTS

| | | |
|---|---|---|
| 8,071,988 B2 | 12/2011 | Lee et al. |
| 8,203,260 B2 | 6/2012 | Li et al. |
| 8,256,947 B2 | 9/2012 | Harle et al. |
| 8,286,378 B2 | 10/2012 | Martin et al. |
| 8,408,766 B2 | 4/2013 | Wilson et al. |
| 8,421,811 B2 | 4/2013 | Odland et al. |
| 8,466,438 B2 | 6/2013 | Lambert et al. |
| 8,519,362 B2 | 8/2013 | Labrot et al. |
| 8,539,702 B2 | 9/2013 | Li et al. |
| 8,606,430 B2 | 12/2013 | Seder et al. |
| 8,624,716 B2 | 1/2014 | Englander |
| 8,631,598 B2 | 1/2014 | Li et al. |
| 8,724,054 B2 | 5/2014 | Jones |
| 8,773,012 B2 | 7/2014 | Ryu et al. |
| 2002/0186556 A1 | 12/2002 | Wojnarowski |
| 2003/0179548 A1 | 9/2003 | Becker et al. |
| 2004/0213088 A1 | 10/2004 | Fuwausa |
| 2005/0194607 A1 | 9/2005 | Burnett et al. |
| 2006/0087826 A1 | 4/2006 | Anderson, Jr. |
| 2009/0219730 A1 | 9/2009 | Syfert et al. |
| 2012/0001406 A1 | 1/2012 | Paxton et al. |
| 2013/0335994 A1 | 12/2013 | Mulder et al. |
| 2014/0266666 A1 | 9/2014 | Habibi |

FOREIGN PATENT DOCUMENTS

| | | |
|---|---|---|
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| WO | 2004099664 A1 | 11/2004 |
| WO | 2006047306 A1 | 5/2006 |
| WO | 2014068440 A1 | 5/2014 |

PHOTOLUMINESCENT LIFT GATE LAMP

CROSS-REFERENCE TO RELATED APPLICATION

This application is a continuation-in-part of U.S. patent application Ser. No. 14/301,635, filed Jun. 11, 2014, and entitled "PHOTOLUMINESCENT VEHICLE READING LAMP," which is a continuation-in-part of U.S. patent application Ser. No. 14/156,869, filed on Jan. 16, 2014, entitled "VEHICLE DOME LIGHTING SYSTEM WITH PHOTOLUMINESCENT STRUCTURE," which is a continuation-in-part of U.S. patent application Ser. No. 14/086,442, filed Nov. 21, 2013, and entitled "VEHICLE LIGHTING SYSTEM WITH PHOTOLUMINESCENT STRUCTURE." The aforementioned related applications are hereby incorporated by reference in their entirety.

FIELD OF THE INVENTION

The present invention generally relates to vehicle lighting systems, and more particularly, to vehicle lighting systems employing photoluminescent structures.

BACKGROUND OF THE INVENTION

Illumination arising from photoluminescent materials offers a unique and attractive viewing experience. It is therefore desired to incorporate such photoluminescent materials in portions of vehicles to provide ambient and task lighting.

SUMMARY OF THE INVENTION

According to one aspect of the present invention, an illumination apparatus for a vehicle is disclosed. The illumination device comprises a photoluminescent portion disposed on a moveable vehicle closure. The photoluminescent portion is operable to be directed in a substantially downward direction. The device further comprises a light source disposed proximate the photoluminescent portion and configured to emit light at a first wavelength. The photoluminescent portion is configured to convert the first wavelength to at least a second wavelength longer than the first wavelength to illuminate a surface beneath the vehicle.

According to another aspect of the present invention, an illumination system for a vehicle is disclosed. The illumination system comprises a first photoluminescent portion and a second photoluminescent portion disposed proximate a handle portion of a lift gate. The illumination system further comprises a light source located proximate the first photoluminescent portion and the second photoluminescent portion. The light source is configured to emit a first emission of light having a first wavelength, and the photoluminescent portions are configured to convert the first wavelength to a plurality of wavelengths longer than the first wavelength.

According to yet another aspect of the present invention, a vehicle illumination apparatus is disclosed. The illumination apparatus comprises a light source disposed proximate a handle portion of a lift gate. The light source is configured to deliver a first emission having a first wavelength through a light guide. The light guide is configured to substantially direct the first emission along a projecting surface. The projecting surface is directed downward relative the vehicle and corresponds to the lift gate in an open position. The projecting surface is configured to convert the first emission to a second emission to illuminate a ground surface proximate the vehicle.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lighting system for a vehicle configured to illuminate a portion of a surface beneath a vehicle. In some implementations, a light source may be utilized to illuminate both the surface beneath the vehicle and a warning lamp. The light source may be configured to emit light at a first wavelength or primary emission to excite a photoluminescent structure. The photoluminescent structure may be configured to convert the first wavelength of the light or the primary emission into a second wavelength or secondary emission. The first wavelength of the light may correspond to a first color of light and the second wavelength may correspond to a second color of light, different from the first color. While the various implementations of the lighting system described herein refer to specific structures demonstrated in reference to at least one automotive vehicle, it will be appreciated that the vehicle lighting system may be utilized in a variety of applications.

Figure 1:
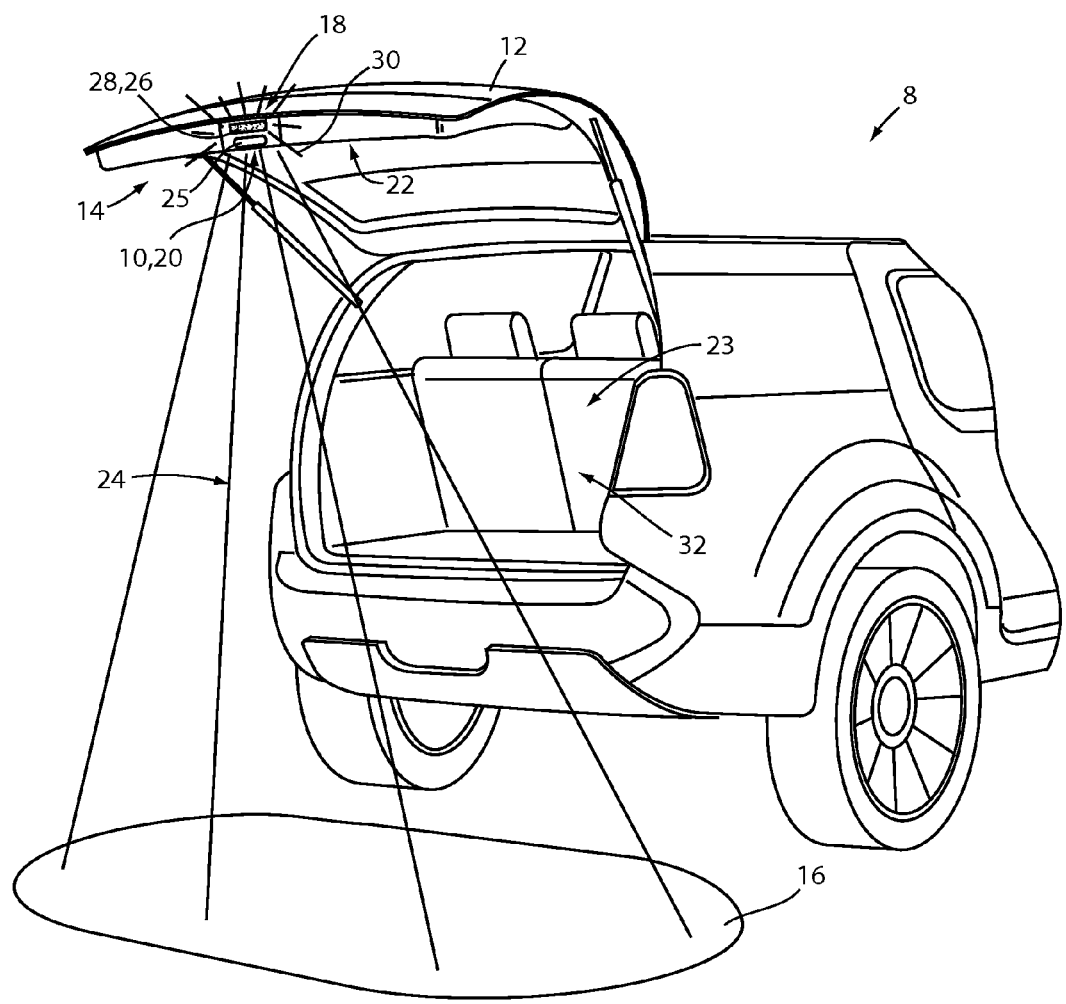
FIG. 1 is a perspective view of an automotive vehicle demonstrating a lighting system.

Referring to FIG. 1, a vehicle 8 is shown having a utility light 10 for a closure or lift gate 12 shown in an open position. The utility light 10 of the vehicle 8 may form a portion of a lighting apparatus 14 configured to illuminate at least a portion of a surface 16 located beneath the vehicle 8. The lighting apparatus 14 comprises a light source 18 that may be controlled by one or more lighting modules incorporated in the vehicle 8. For example, a lighting module of the vehicle 8 may be configured to selectively activate the light source 18 in response to the lift gate 12 being oriented in the open position. The light source 18 may also be activated by a switch or sensor, for example a toggle switch or proximity sensor.

The light source 18 is configured to emit a first emission of light at a first wavelength. A first photoluminescent portion 20 is disposed proximate a downward facing portion 22 of the lift gate 12 when the lift gate is oriented in the open position and may similarly be utilized in any of a plurality of closures of the vehicle 8, for example a hood or deck-lid of the vehicle 8. The light emission from the utility light 10 may be emitted from the first photoluminescent portion 20 as a second emission 24. Additionally, the utility light 10 may be utilized to illuminate an interior portion 23 of the vehicle 8 when the lift gate is oriented in the closed position.

In some implementations, the first photoluminescent portion 20 may further be located proximate a handle portion 25 of the lift gate 12. The first photoluminescent portion 20 is configured to convert the first emission having the first wavelength of the light emitted from the light source 18 to the second emission 24 having a second wavelength. The second wavelength of the light may correspond to at least one wavelength having a longer wavelength or spectral emission than the first wavelength. As discussed herein, the first photoluminescent portion 20 and other photoluminescent portions may be configured to have photochemical properties configured to convert the first wavelength of light from the light source 18 to the second wavelength and additional wavelengths (e.g. a third wavelength), which may include various combinations of wavelengths to emit light from the lighting apparatus 14.

The first wavelength may correspond to a primary emission having a violet or deep blue color. The first wavelength may have a peak wavelength of approximately less than 500 nm. The second wavelength may correspond to one or more wavelengths of light corresponding to the second emission 24 having at least one wavelength greater than the first wavelength. In some implementations, the second wavelength may correspond to a plurality of wavelengths that may cause the second emission 24 to appear as significantly white light. In this configuration, the light emitted from the light source 18 at the first wavelength is configured to excite the first photoluminescent portion 20. In response to the excitation caused by the light at the first wavelength, the first photoluminescent portion 20 is configured to convert the first wavelength to emit the second emission 24 to illuminate the surface 16 beneath the vehicle 8.

In some implementations, the light source 18 is further configured to illuminate a second photoluminescent portion 26. The second photoluminescent portion 26 may be disposed on the closure or lift gate 12 such that the second photoluminescent portion 26 is directed outward from the vehicle 8 when the lift gate 12 is oriented in the open position. In this configuration, the second photoluminescent portion 26 is configured to improve the visibility of the vehicle 8 to approaching vehicles.

The second photoluminescent portion 26 may be dispersed in a material or coating of a warning lamp 28 which may be disposed proximate the handle portion 25. The second photoluminescent portion 26 of the warning lamp 28 may be configured to receive the first emission at the first wavelength and convert the first emission to a third emission 30 having a third wavelength. The third wavelength may correspond to a different wavelength than the first wavelength and the second wavelength. In some implementations, the third wavelength may be configured to emit a red light such that the third emission 30 from the warning lamp 28 is highly visible and warns approaching vehicle of the location of the vehicle 8.

The light emitted from the light source 18 at the first wavelength may correspond to a color of light that is less perceptible by the human eye compared to the second wavelength and the third wavelength. In this advantageous configuration, the first emission emitted from the light source 18 at the first wavelength may be projected toward the second photoluminescent portion 26 without being visibly obvious to an operator of the vehicle 8 accessing a rear passenger and/or cargo compartment 32 of the vehicle 8. This configuration may provide for the second emission 24 and the third emission 30 to be activated by the light source 18 which is projected from a single location. In this configuration, the lighting apparatus 14 is configured to provide lighting utility and/or accent lighting to illuminate at least a portion of a surface 16 located beneath the vehicle 8 and also illuminate the warning lamp 26. By limiting the number of light sources required to provide the lighting discussed herein, the disclosure provides for a cost-effective method for providing lighting for the vehicle 8.

Figure 2A:
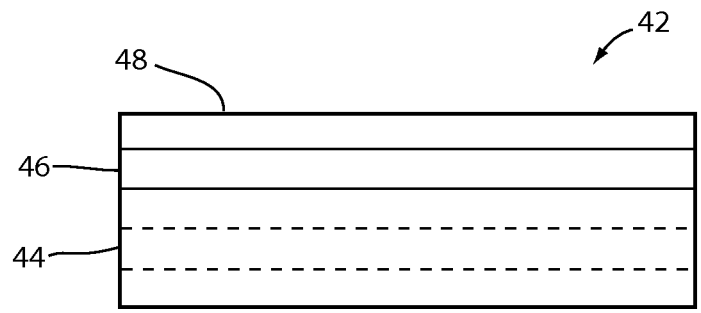
FIG. 2A illustrates a photoluminescent structure rendered as a coating.
Figure 2B:
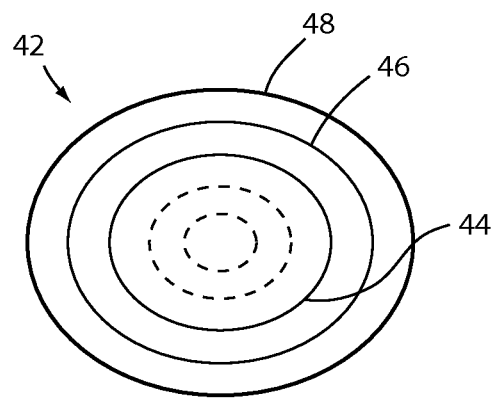
FIG. 2B illustrates the photoluminescent structure rendered as a discrete particle.
Figure 2C:
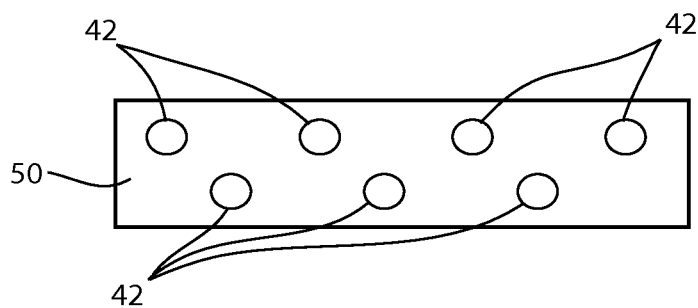
FIG. 2C illustrates a plurality photoluminescent structures rendered as discrete particles and incorporated into a separate structure.

Referring to FIGS. 2A-2C, a photoluminescent structure 42 is generally shown rendered as a coating (e.g. a film) capable of being applied to a vehicle fixture, a discrete particle capable of being implanted in a vehicle fixture, and a plurality of discrete particles incorporated into a separate structure capable of being applied to a vehicle fixture, respectively. The photoluminescent structure 42 may correspond to the photoluminescent portions as discussed herein, for example the first photoluminescent portion 20 and the second photoluminescent portion 26. At the most basic level, the photoluminescent structure 42 includes an energy conversion layer 44 that may be provided as a single layer or a multilayer structure, as shown through broken lines in FIGS. 2A and 2B.

The energy conversion layer 44 may include one or more photoluminescent materials having energy converting elements selected from a phosphorescent or a fluorescent material. The photoluminescent materials may be formulated to convert an inputted electromagnetic radiation into an outputted electromagnetic radiation generally having a longer wavelength and expressing a color that is not characteristic of the inputted electromagnetic radiation. The difference in wavelength between the inputted and outputted electromagnetic radiations is referred to as the Stokes shift and serves as the principle driving mechanism for an energy conversion process corresponding to a change in wavelength of light, often referred to as down conversion. In the various implementations discussed herein, each of the wavelengths of light (e.g. the first wavelength, etc.) correspond to electromagnetic radiation utilized in the conversion process.

Each of the photoluminescent portions may comprise at least one photoluminescent structure 42 comprising an energy conversion layer (e.g. conversion layer 44). The energy conversion layer 44 may be prepared by dispersing the photoluminescent material in a polymer matrix 50 to form a homogenous mixture using a variety of methods. Such methods may include preparing the energy conversion layer 44 from a formulation in a liquid carrier medium and coating the energy conversion layer 44 to a desired planar and/or non-planar substrate of a vehicle fixture. The energy conversion layer 44 coating may be deposited on a vehicle fixture by painting, screen printing, spraying, slot coating, dip coating, roller coating, and bar coating. Additionally, the energy conversion layer 44 may be prepared by methods that do not use a liquid carrier medium.

For example, a solid state solution (homogenous mixture in a dry state) of one or more photoluminescent materials may be incorporated in a polymer matrix 50 to provide the energy conversion layer 44. The polymer matrix 50 may be formed by extrusion, injection molding, compression molding, calendaring, thermoforming, etc. In instances where one or more energy conversion layers 44 are rendered as particles, the single or multi-layered energy conversion layers 44 may be implanted into a vehicle fixture or panel. When the energy conversion layer 44 includes a multilayer formulation, each layer may be sequentially coated. Additionally, the layers can be separately prepared and later laminated or embossed together to form an integral layer. The layers may also be coextruded to prepare an integrated multi-layered energy conversion structure.

Referring back to FIGS. 2A and 2B, the photoluminescent structure 42 may optionally include at least one stability layer 46 to protect the photoluminescent material contained within the energy conversion layer 44 from photolytic and thermal degradation. The stability layer 46 may be configured as a separate layer optically coupled and adhered to the energy conversion layer 44. The stability layer 46 may also be integrated with the energy conversion layer 44. The photoluminescent structure 42 may also optionally include a protection layer 48 optically coupled and adhered to the stability layer 46 or any layer or coating to protect the photoluminescent structure 42 from physical and chemical damage arising from environmental exposure.

The stability layer 46 and/or the protective layer 48 may be combined with the energy conversion layer 44 to form an integrated photoluminescent structure 42 through sequential coating or printing of each layer, or by sequential lamination or embossing. Alternatively, several layers may be combined by sequential coating, lamination, or embossing to form a substructure. The substructure may then be laminated or embossed to form the integrated photoluminescent structure 42. Once formed, the photoluminescent structure 42 may be applied to a chosen vehicle fixture.

In some implementations, the photoluminescent structure 42 may be incorporated into a vehicle fixture as one or more discrete multilayered particles as shown in FIG. 2C. The photoluminescent structure 42 may also be provided as one or more discrete multilayered particles dispersed in a polymer formulation 50 that is subsequently applied to a vehicle fixture or panel as a contiguous structure. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

Figure 3:
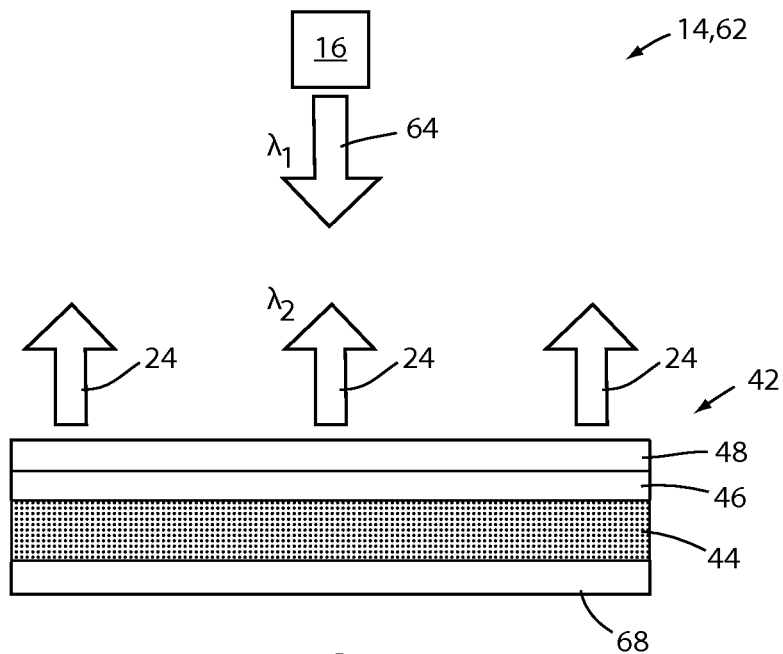
FIG. 3 is schematic view of a front-lit configuration of a lighting apparatus configured to convert a first wavelength of light to at least a second wavelength.

Referring to FIG. 3, the lighting apparatus 14 is generally shown according to a front-lit configuration 62. In this configuration, the light or a first emission 64 emitted from the light source 16 is converted to a second emission 24 by the energy conversion layer 44. The first emission 64 comprises a first wavelength $\lambda_1$, and the second emission 24 comprises a second wavelength $\lambda_2$. The lighting apparatus 14 comprises the photoluminescent structure 42 disposed on or in at least one photoluminescent portion. The photoluminescent structure 42 may be rendered as a coating and applied to a substrate 68 of a vehicle fixture, for example an interior panel of the lift gate 12. The photoluminescent material may also be dispersed as a polymer matrix 50 corresponding to the energy conversion layer 44.

In some implementations, the energy conversion layer 44 may further include the stability layer 46 and/or protective layer 48. In response to the light source 16 being activated, the first emission 64 is received by the energy conversion layer 44 and converted from the first emission 64 having the first wavelength $\lambda_1$ to the second emission 24 having at least the second wavelength $\lambda_2$. The second emission 24 may comprise a plurality of wavelengths configured to emit any color of light from the photoluminescent portion 18.

In various implementations, the lighting apparatus 14 comprises at least one photoluminescent material incorporated in the polymer matrix 50 and/or energy conversion layer 44 and is configured to convert the first emission 64 at the first wavelength $\lambda_1$ to the second emission 24 having at least the second wavelength $\lambda_2$. In order to generate the plurality of wavelengths, the energy conversion layer 44 may comprise one or more photoluminescent materials configured to emit the second emission 24 as wavelengths of light in the red, green, and/or blue color spectrums. Such photoluminescent materials may further be combined to generate a wide variety of colors of light for the second emission 24. For example, the red, green, and blue-emitting photoluminescent materials may be utilized in a variety of proportions and combinations to control the output color of the second emission 24.

Each of the photoluminescent materials may vary in output intensity, output wavelength, and peak absorption wavelengths based on a particular photochemical structure and combinations of photochemical structures utilized in the energy conversion layer 44. As an example, the second emission 24 may be changed by adjusting the wavelength of the first emission $\lambda_1$ to activate the photoluminescent materials at different intensities to alter the color of the second emission 24. In addition to, or alternatively to the red, green, and blue-emitting photoluminescent materials, other photoluminescent materials may be utilized alone and in various combinations to generate the second emission 24 in a wide variety of colors. In this way, the lighting apparatus 14 may be configured for a variety of applications to provide a desired lighting color and effect for a vehicle.

To achieve the various colors and combinations of photoluminescent materials described herein, the lighting apparatus 14 may utilize any form of photoluminescent materials, for example phospholuminescent materials, organic and inorganic dyes, etc. For additional information regarding fabrication and utilization of photoluminescent materials to achieve various emissions, refer to U.S. Pat. No. 8,207,511 to Bortz et al., entitled "PHOTOLUMINESCENT FIBERS, COMPOSITIONS AND FABRICS MADE THEREFROM," filed Jun. 5, 2009; U.S. Pat. No. 8,247,761 to Agrawal et al., entitled "PHOTOLUMINESCENT MARKINGS WITH FUNCTIONAL OVERLAYERS," filed Oct. 19, 2011; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Mar. 4, 2013; U.S. Pat. No. 8,664,624 B2 to Kingsley et al., entitled "ILLUMINATION DELIVERY SYSTEM FOR GENERATING SUSTAINED SECONDARY EMISSION," filed Nov. 14, 2012; U.S. Patent Publication No. 2012/0183677 to Agrawal et al., entitled "PHOTOLUMINESCENT COMPOSITIONS, METHODS OF MANUFACTURE AND NOVEL USES," filed Mar. 29, 2012; U.S. Patent Publication No. 2014/0065442 A1 to Kingsley et al., entitled "PHOTOLUMINESCENT OBJECTS," filed Oct. 23, 2012; and U.S. Patent Publication No. 2014/0103258 A1 to Agrawal et al., entitled "CHROMIC LUMINESCENT COMPOSITIONS AND TEXTILES," filed Dec. 19, 2013, all of which are incorporated herein by reference in their entirety.

The light source 16 may also be referred to as an excitation source and is operable to emit at least the first emission 64. The light source 16 may comprise any form of light source, for example halogen lighting, fluorescent lighting, light emitting diodes (LEDs), organic LEDs (OLEDs), polymer LEDs (PLEDs), solid state lighting or any other form of lighting configured to output the first emission 64. The first emission 64 from the light source 16 may be configured such that the first wavelength $\lambda_1$ corresponds to at least one absorption wavelength of the one or more photoluminescent materials of the energy conversion layer 44 and/or polymer matrix 50. In response to receiving the light at the first wavelength $\lambda_1$, the energy conversion layer 44 may be excited and output the one or more output wavelengths, for example, the second emission having the second wavelength $\lambda_2$. The first emission 64 provides an excitation source for the energy conversion layer 44 by targeting absorption wavelengths of a particular photoluminescent material or combination thereof utilized therein. As such, the lighting apparatus 14 may configured to output the second emission 24 to generate a desired light intensity and color.

In an exemplary implementation, the light source 16 comprises an LED configured to emit the first wavelength $\lambda_1$ which may correspond to a blue spectral, violet, and/or ultraviolet color range. The blue spectral color range comprises a range of wavelengths generally expressed as blue light (~440-500 nm). In some implementations, the first wavelength $\lambda_1$ may comprise a wavelength in the ultraviolet and near ultraviolet color range (~100-450 nm). In an exemplary implementation, $\lambda_1$ may be approximately equal to 470 nm. Though particular wavelengths and ranges of wavelengths are discussed in reference to the first wavelength $\lambda_1$, the first wavelength $\lambda_1$ may generally be configured to excite any photoluminescent material.

In an exemplary implementation, the first wavelength $\lambda_1$ may be approximately less than 500 nm. The blue spectral color range and shorter wavelengths may be utilized as an excitation source for the lighting apparatus 14 due to these wavelengths having limited perceptual acuity in the visible spectrum of the human eye. By utilizing shorter wavelengths for the first wavelength $\lambda_1$, and converting the first wavelength with the conversion layer 44 to at least one longer wavelength, the lighting apparatus 14 creates a visual effect of light originating from the photoluminescent structure 42.

As discussed herein, each of the plurality of wavelengths corresponding to the second emission 24 and the third emission 30 may correspond to a significantly different spectral color range. The second wavelength $\lambda_2$ may correspond to a plurality of wavelengths configured appear as substantially white light. The plurality of wavelengths may be generated by a red-emitting photoluminescent material having a wavelength of approximately 620-750 nm, a green emitting photoluminescent material having a wavelength of approximately 526-606 nm, and a blue or blue green emitting photoluminescent material having a wavelength longer than the first wavelength $\lambda_1$ and approximately 430-525 nm in one embodiment. The plurality of wavelengths may be utilized to generate a wide variety of colors of light from the each of the photoluminescent portions (e.g. the first photoluminescent portion 24 and the second photoluminescent portion 26) converted from the first wavelength $\lambda_1$. The third emission 30 may similarly utilize photoluminescent materials to output a color of light different from the first emission 64 and the second emission 24.

Figure 4:
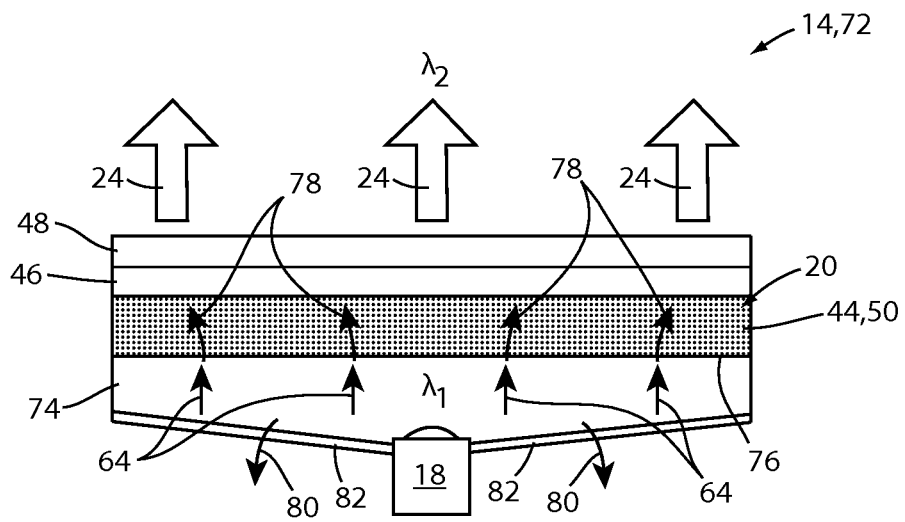
FIG. 4 is schematic view of a back-lit configuration of a lighting apparatus configured to convert a first wavelength of light to at least a second wavelength.

Referring to FIG. 4, the lighting apparatus 14 is generally shown according to a back-lit configuration 72 to convert the first emission 64 from the light source 16 to the second emission 24. In this configuration, the lighting apparatus 14 may comprise a light guide 74 configured to channel the light at the first wavelength $\lambda_1$ substantially along the first photoluminescent portion 20. The light guide 74 may be of any material configured to transmit the light at the first wavelength $\lambda_1$ substantially along the extents of a surface 76 of the light guide 74. In some implementations, the light guide 74 may comprise a polymeric material configured to provide a refractive index such that the light at the first wavelength $\lambda_1$ is transmitted consistently along the surface 76.

The backlit configuration comprises an energy conversion layer 44 and/or photoluminescent material dispersed in a polymer matrix 50. Similar to the energy conversion layer 44 demonstrated in reference to the front-lit configuration 62, the energy conversion layer 44 may be configured to be excited and output the one or more wavelengths corresponding to the second wavelength $\lambda_2$ in response to receiving the first emission 64. The plurality of wavelengths of the second emission 24 may be configured to emit any color of light from the first photoluminescent portion 20 in response to the excitation of the energy conversion layer 44. The color of the light corresponding to the second emission 24 may be controlled by utilizing particular types and/or ratio of photoluminescent materials as discussed herein. The second emission 24 may correspond to the light output from the utility light 10.

In some implementations, the first photoluminescent portion is configured to convert a first portion 78 of the first emission 64 to the second emission 24. In the backlit configuration 72, the lighting apparatus may further be configured to output a second portion 80 of the first emission 64 from a back portion 82 of the light guide 74. The second portion 80 of the first emission 64 may remain at the first wavelength $\lambda_1$ such that the second portion of the first wavelength may be utilized to generate the third emission 30 as discussed in reference to FIGS. 1, 5 and 6. The light guide 74 may be configured to direct the second portion 80 of the first emission 64 toward the back portion 82 which may correspond to an inner surface of the light guide 74. The inner surface may comprise at least one transmissive or semi-transmissive portion such that the second portion 80 of the first emission 64 may be emitted outward from the back portion 82 of the light guide 14.

Figure 5:
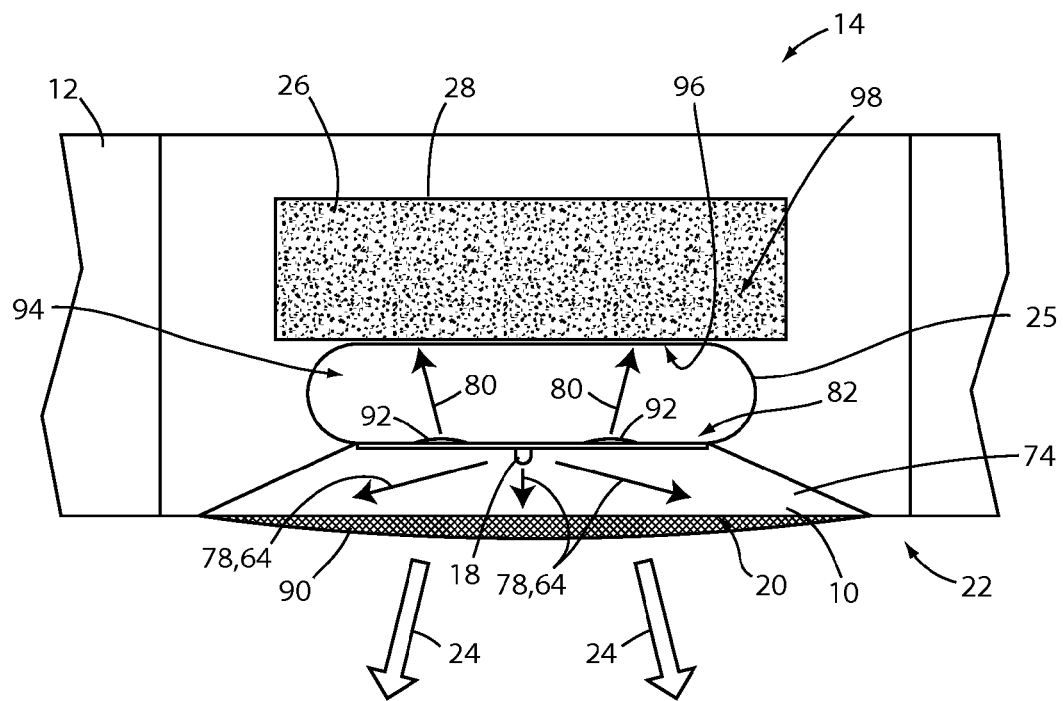
FIG. 5 is a detailed view of a warning lamp disposed on a vehicle closure.
Figure 6:
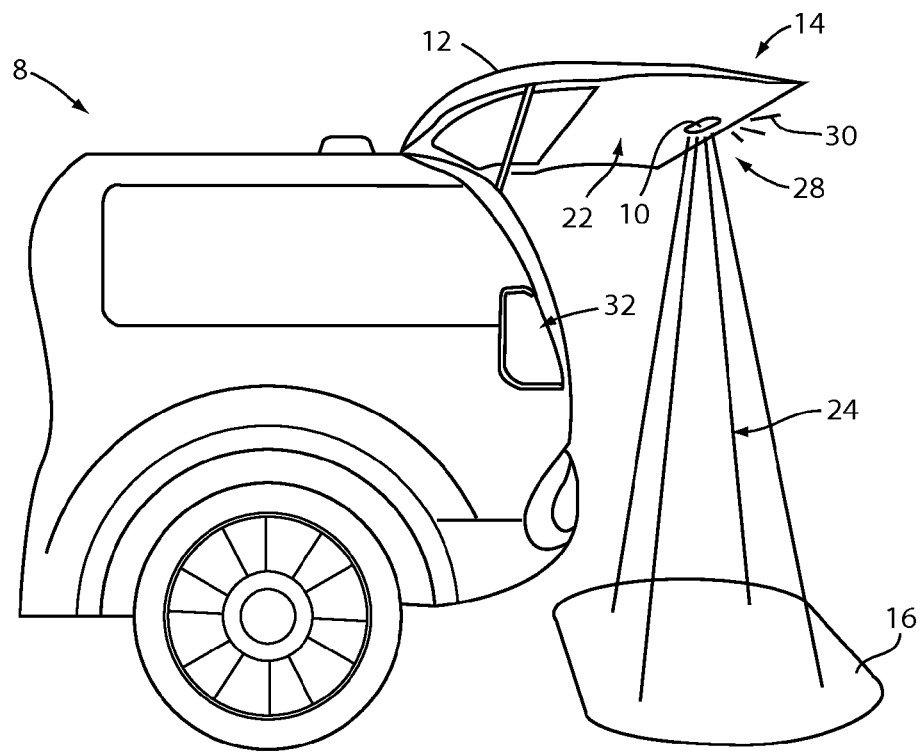
FIG. 6 is a perspective view of a vehicle having a light source configured to illuminate a portion of a surface beneath a lift gate of the vehicle.

Referring now to FIGS. 5 and 6, the lighting apparatus 14 is shown demonstrating the utility light 10 and the warning lamp 28. The lighting apparatus 14 may be selectively activated by a lighting controller of the vehicle 8 configured to control the light source 18. The lighting controller may activate the light source based on a switch indicating that the lift gate 12 is oriented in the open position and may also be activated by a switch or other controls in the vehicle 8 including a toggle switch, proximity sensor, ambient light sensor, and/or a combination thereof. The lighting apparatus 14 is operable to illuminate at least a portion of a surface 16 located beneath the vehicle 8 to provide for safe and easy access to the cargo compartment 32 of the vehicle 8.

When the light source 18 is activated, the first emission 64 is emitted into the light guide 74. The first portion 78 of the first emission 64 is converted by the first photoluminescent portion 20 to generate the second emission 24. The second emission 24 is output from the light guide via a projecting surface 90. The projecting surface 90 is configured to direct the second emission 24 outward from the utility light 10 to illuminate the portion of the surface 16 located beneath the vehicle 8. As shown in FIG. 6, the portion of the surface 16 may be located rearward of the vehicle 8 and at least partially under the lift gate 12 when the lift gate 12 is oriented in the open position.

When the light source 18 is activated, the second portion 80 of the first emission 64 is transmitted through the back portion 82 of the light guide 74. In some implementations, the back portion 80 may comprise one or more optic devices 92 or portions configured to direct the second portion 80 of the first emission 64 into a handle cavity 94 comprising a volumetric space formed by the handle portion 25. The second portion 80 of the first emission 64 may pass through the handle cavity 94 and be received or absorbed by an inner surface 96 of the warning lamp 28.

The inner surface 96 of the warning lamp 28 may comprise a light-transmissive material configured to receive the second portion 80 of the first emission 64. The first wavelength $\lambda_1$ of the first emission 64 may be nearly invisible as it passes through the handle cavity 94 due to the limited visual acuity of the human eye to the first wavelength $\lambda_1$, which may be approximately less than 500 nm. Once received by the inner surface 96 of the warning lamp 28, the second portion 80 of the first emission 64 having the first wavelength $\lambda_1$ is converted to the third emission 30 having the third wavelength $\lambda_3$ by the second photoluminescent portion 26. The third emission 30 is then emitted outward from the warning lamp 28 to alert approaching vehicles of the location of the vehicle 8 which may correspond to a hazardous location, for example a shoulder of a busy thoroughfare.

The warning lamp 28 may comprise a body portion configured to transmit the second portion 80 of the first emission 64 to the second photoluminescent portion 26. The body portion may comprise an optic or light guiding device and/or structure configured to transmit and distribute the second portion 80 of the first emission 64 proximate an outer surface 98 of the warning lamp 28. The outer surface 98 may have the photoluminescent structure of the second photoluminescent portion 26 applied as a coating and/or disposed therein such that the second portion 80 of the first emission 64 is converted to the third emission 30.

The lighting apparatus as described herein may provide various benefits including a cost-effective system operable to provide a utility light for a lift gate and may further provide for a warning lamp configured to alert approaching vehicles of potential danger. The various implementations described herein including the particular locations and configurations of each of the photoluminescent portions may vary without departing from the spirit of the disclosure. The subject matter of the instant disclosure provides for a lighting apparatus that may provide for safe access to a cargo compartment of a vehicle.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An illumination apparatus for a vehicle lift gate comprising:
   a photoluminescent portion disposed on a moveable vehicle closure and operable to be directed in a substantially downward direction;
   a light source disposed proximate the photoluminescent portion and configured to emit light at a first wavelength, wherein the photoluminescent portion is configured to convert the first wavelength to at least a second wavelength longer than the first wavelength to illuminate a surface beneath the vehicle; and
   a warning lamp disposed proximate a lift gate handle that receives light from the light source.

2. The illumination apparatus according to claim 1, wherein the photoluminescent portion is directed in the substantially downward direction relative to the lift gate located in an open position.

3. The illumination apparatus according to claim 1, wherein the warning lamp comprises a second photoluminescent portion.

4. The illumination apparatus according to claim 3, wherein the light source is configured to deliver a portion of the light at the first wavelength to the second photoluminescent portion.

5. The illumination apparatus according to claim 4, wherein the second photoluminescent portion is configured to generate light having a third wavelength, wherein a first color of the second wavelength is different than a second color of the second wavelength.

6. An illumination system for a vehicle comprising:
   a first photoluminescent portion to illuminate a portion of a ground surface proximate a lift gate and a second photoluminescent portion disposed to illuminate proximate a handle portion of the lift gate; and
   a light source located proximate the first photoluminescent portion and the second photoluminescent portion configured to emit a first emission of light having a first wavelength, wherein the photoluminescent portions are configured to convert the first wavelength to a plurality of wavelengths longer than the first wavelength.

7. The illumination system according to claim 6, wherein the first photoluminescent portion is directed in a substantially downward direction toward the ground surface relative to the vehicle and corresponding to the lift gate located in an open position.

8. The illumination system according to claim 7, further comprising a light guide configured to receive the first emission and direct the first emission substantially along a light projecting surface comprising the first photoluminescent portion.

9. The illumination system according to claim 8, wherein the first photoluminescent portion proximate the projecting surface is configured to convert the first wave length to a second emission comprising the plurality of wavelengths longer than the first wavelength.

10. The illumination system according to claim 8, further comprising a warning lamp comprising the second photoluminescent portion.

11. The illumination system according to claim 10, wherein the warning lamp is directed in a substantially rearward direction relative to the vehicle and corresponding to the lift gate located in the open position.

12. The illumination system according to claim 10, wherein the light guide is configured to direct a portion of the first emission toward the warning lamp to illuminate the second photoluminescent portion and emit a third emission.

13. A vehicle illumination apparatus comprising:
- a light source disposed proximate a handle portion of a lift gate, the light source configured to deliver a first emission having a first wavelength through a light guide, the light guide configured to substantially direct the first emission along a projecting surface, the projecting surface directed downward relative the vehicle and corresponding to the lift gate in an open position, wherein the projecting surface is configured to convert the first emission to a second emission to illuminate a ground surface proximate the vehicle; and
- a warning lamp, the warning lamp comprising a second photoluminescent portion that receives light from the light source.

14. The vehicle illumination apparatus according to claim 13, wherein the second emission comprises a plurality of wavelengths of light configured to generate a substantially white light.

15. The vehicle illumination apparatus according to claim 13, where the light guide is configured to direct a portion of the first emission to the warning lamp to illuminate the second photoluminescent material to emit a third emission.

\* \* \* \* \*